Dec. 15, 1953  R. N. SHIELDS  2,662,415
COG DRIVE
Filed April 30, 1948  2 Sheets-Sheet 1
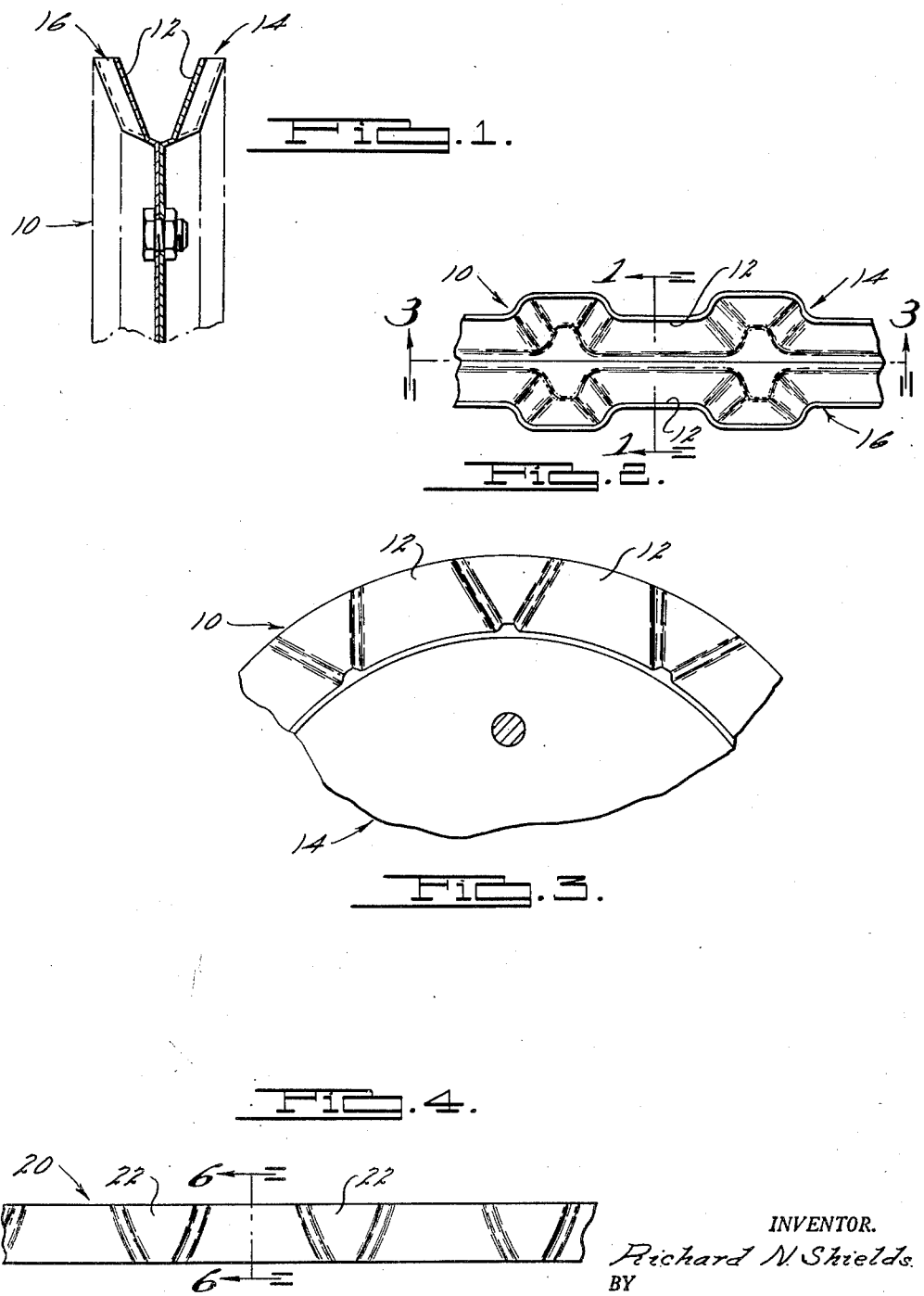
INVENTOR.
Richard N. Shields.
BY
Harness and Harris
ATTORNEYS.

Dec. 15, 1953   R. N. SHIELDS   2,662,415
COG DRIVE

Filed April 30, 1948   2 Sheets-Sheet 2

INVENTOR.
Richard N. Shields.
BY
Harness and Harris
ATTORNEYS.

Patented Dec. 15, 1953

2,662,415

UNITED STATES PATENT OFFICE 2,662,415

COG DRIVE

Richard N. Shields, Detroit, Mich., assignor to Chrysler Corporation, Highland Park, Mich., a corporation of Delaware Application April 30, 1948, Serial No. 24,277

7 Claims. (Cl. 74—229)

This invention relates to power transmission mechanisms of the belt and pulley type, and more particularly to V-belt and sheave structure.

One object of the invention is to provide a positive and non-slipping drive which will be substantially noiseless in operation and free from the requirement of enclosure and internal lubrication inherent with both gear and chain drives.

Another object is at the same time to provide a practicable cogged pulley susceptible of cheap manufacture, such as from stampings, as contrasted with casting and attendant machining.

An additional object is to produce a cog belt drive in which pulley teeth do not tend to dig out the belt at the recesses defined by its cogs at their roots and thereby expose the reinforcing strands to wear and possible cutting. Such local wearing action herein sought to be avoided is that which might be expected if a flat belt were toothed to run on "silent-chain" type pulleys. There the root faces of the belt teeth are the bearing surfaces sustaining the belt tension load and if stretched over the tips of the pulley teeth in order to run thereon, would experience a picking action by the tips.

It is generally known that belting, especially after the advent of the V-belt, has largely supplanted chains in power drive installations by virtue of its relatively quiet operation, freedom from requiring attention as regards lubrication and maintenance, ability to absorb shock loads and vibrations from the driving source, and the safety faculty of slipping in event of an otherwise damaging overload. Yet the latter feature—the ability to slip—is ever present even though amounting sometimes to as little as one per cent under such ideal conditions as moderate speed, light load, large diameter pulleys, 180° wrap, absence of whip, high coefficient of friction and employment of multiple belts. To be absolutely strict in this regard, perhaps it should be added that for such a low slip as 1%, actually the belt does not bodily slip, the 1% speed loss being accounted for by the so-called "creep" characteristic. There still exists, notwithstanding, that speed loss which leaves positive drive unattained.

Hence, with slip being prohibitive in some installations, the use of the usual belt drive therein is precluded. For instance, in an internal combustion engine the drive for the camshaft or distributor shaft must be a positive one; and if the engine is equipped with a supercharger, a positive drive for it is highly desirable, particularly at low speeds and during periods of acceleration. Now for application under such circumstances, were a cylindrical pulley to be grooved transversely along its face and the usual companion flat belt transversely ribbed on its underside for engagement therewith, at higher speeds the belt would produce the objectionable noise characteristic of its counterpart the chain. Moreover, when higher loads and speeds were encountered, the belt ride-out would increase to a point where the belt ribs would systematically jump out of the grooves and across them. Thus result both the undesirable noise and slip.

The instant invention however is able to surmount these difficulties by employment of, rather than a pulley, a sheave mounting cogs in the sides of its V-groove whereby mating cogs provided along the sides of the companion V-belt continue positive mesh despite the extent of pitch-line shift radially due to belt ride-out. Such advantageous behavior will become more apparent upon consideration of the following description and of the accompanying drawings, which latter show a preferred embodiment of my invention, and in which:

Fig. 1 is a cross-sectional view of the V-type sheave;

Fig. 2 is a plan view of the cogged V-groove in the sheave;

Fig. 3 is a section taken along line 3—3 of Fig. 2;

Fig. 4 is a side view of the cogged V-belt;

According to the illustrated embodiment of my invention, 10 generally indicates a pulley or sheave of the V-type, the V-groove of which has been formed with teeth or cogs 12 in the sides. Sheave 10 may be fabricated from two symmetrical stampings 14 and 16, each of which assumes a dish-shape with the depending annular rims producing a corrugated effect. These stampings may be affixed together, back-to-back, by the usual means of rivets, welds, or bolts, etc.

Figure 5:
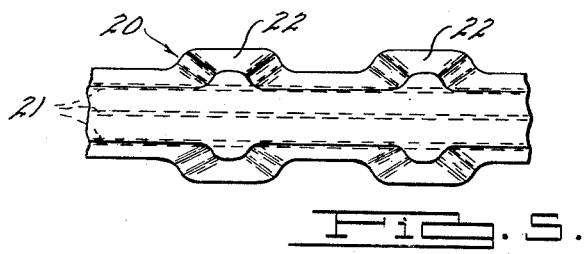
Fig. 5 is a bottom plan view of the V-belt.
Figure 6:
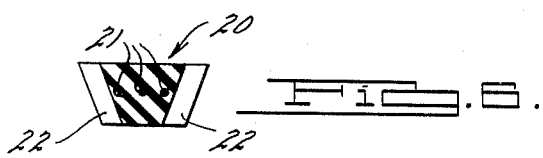
Fig. 6 is a section taken along line 6—6 of Fig. 4.

The V-groove in 10 receives a V-belt 20 for running engagement therewith. This belt is preferably reinforced with longitudinal elements 21 (Fig. 6) relatively unyieldable in tension. Wire has been found most satisfactory, and the strands may be arranged in a layer or built up in layers, or else disposed as a grommet-like reinforcement. These tension elements are desirable to prevent any stretch which would permit the belt teeth later to be described, from jumping out of mesh once engaged. The V-belt does not extend to the bottom of the groove, but rides up in it and wedgingly engages its sides. Either the V-sheave or the V-belt may be the driving member.

The cogs 12 are adapted to mesh with corresponding teeth or cogs indicated at 22 on the companion V-belt 20 which present a peak and valley profile. Cogs 22 may be seen to extend laterally of 20 and far enough to intermesh with inner surfaces of the sheave, whereby the sides of the V-groove provide the working surface of engagement with the belt and serve as the support for it.

Preferably the cogs of each member are opposed, leaving 10 a symmetrical member and also 20. But within the broader aspects of the invention, these cogs could be staggered to the end that they go into mesh alternately as between opposite sides instead of simultaneously. In fact, a different pitch might conceivably be employed on one side as contrasted with the other, and further, the normal pitch of the belt teeth might be different from the normal pitch of the complemental sheave teeth. Again, within the broader aspects of the invention, the cogs could be omitted altogether from one side of the sheave and the belt allowing a conventional frictional V-type contact so far as that one side is concerned.

Figure 7:
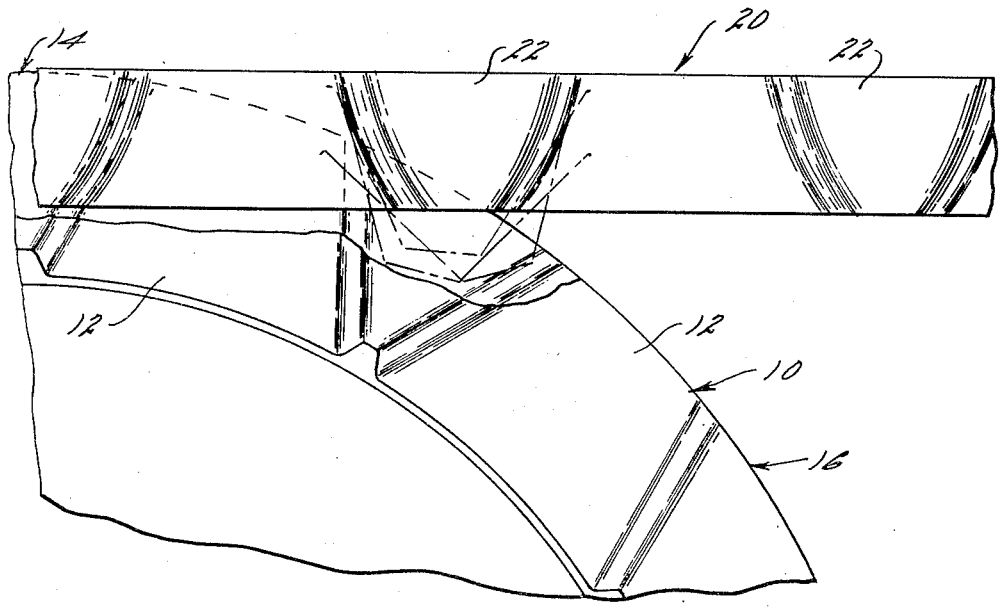
Fig. 7 is a graphical construction for generating the curved tooth profile of the cogs on the V-belt.

In Fig. 7 is illustrated a graphical construction for generating a profile for the cogs which will afford rolling contact of the pitch surfaces throughout the angles of approach and recess. For ease in stamping and for wear, meshing, and other considerations, the profile of the cogs of the V-sheave might assume the form of a straight line and may be disposed such that the pressure angle amounts to approximately 30°. The contour of the belt cogs, though, presents a curved configuration (involute) in order to provide the rolling contact action desired. It is to be understood, however, that the belt cogs could satisfactorily be made straight-sided and the sheave cogs shaped as the curved (involute) teeth, or else both belt cogs and sheave cogs might be straight or both might be curved.

The above noted rolling contact action is but one of the factors contributing to the long wear characteristic of the belt of this invention. The cog profile of the sheave does not present any square or acute angles over which the belt must be passed; and the plane of the contacting surface is at an angle to the belt tension load such that only a component of the load must be sustained over the obtuse angles presented. Hence, the sheave cogs will not have a strong tendency to pick at the belt between the flanks of the cogs and to expose and cut the reinforcing strands.

The sheave 10 is preferably constructed of some hard, rigid material as metal, wood, hard rubber, synthetic plastic, or the like; while the belt may be formed of a flexible, elastic composition-like rubber. Yet contrariwise, the groove walls may obviously be formed of elastic material and caused to cooperate with relatively inelastic belts.

It will be apparent that this side-cog driving may be applied to belts operating in multiple as well as singly. The invention is also applicable to multiple drives having only one of the driving/driven members provided with cogs.

To be appreciated is the fact that considerably less than 180° arc of belt wrap may be employed while the non-slip feature of this invention is still preserved, so long as two or three cogs are maintained in effective mating engagement there can be a positive drive.

It is to be understood that the present specific disclosure is for the purpose of illustration only and that my invention includes all modifications and equivalents within the scope of the appended claims.

What is claimed is:

1. A power transmission mechanism of the belt and sheave type comprising a peripherally V-grooved sheave having formed in each of the opposed faces of its groove a set of spaced cogs coextensive therewith, and a flexible V-belt embraced in running engagement by said groove, the sides of the V-belt affording the working surfaces of contact with said groove, said sides being provided each with a set of transversely disposed cogs complemental to said groove cogs and meshing therewith for the prevention of relative linear movement, one of said sets of cogs embodying a straight line tooth profile and the other embodying a curved tooth profile, said curved tooth profile conforming to a generated curve contour for affording so-called rolling action in entering and leaving mesh with the straight line tooth profile.

2. The combination with a sheave provided with a peripheral V-groove, of a flexible V-belt adapted to be received by said groove, the V-belt being supported at its sides on the opposed faces of the V-groove and bearing thereon in surface contact, said V-belt being composed of noiseless, longitudinally reinforced non-metallic material and having formed as an integral part of its sides elastic, transversely disposed cogs projecting in a lateralwise direction, the opposed faces of the V-groove being provided with radial, coextensive teeth of straight-line contour, said cogs being adapted to mate with said teeth and incorporating a generated curve contour from flank to crown thereby effecting rolling contact action upon entering and leaving mesh, said mating parts establishing a positive drive as between said sheave and said V-belt.

3. For use with a V-grooved sheave having formed in each of the opposed faces of its groove a set of spaced cogs coextensive therewith and embodying a straight line tooth profile; a flexible V-belt adapted to be received in said V-groove, said V-belt being composed of noiseless longitudinally reinforced, non-metallic material and having its non-parallel sides provided with elastic teeth, said elastic teeth being transversely raised out of the plane of the just-named sides of the belt and incorporating a generated involute curve contour from tooth flank to tooth crown separate from the corresponding belt side just named.

4. For use with a V-grooved sheave having formed in each of the opposed faces of its groove a set of spaced cogs coextensive therewith and embodying a straight line tooth profile; a flexible V-belt adapted to be received in said V-groove, said V-belt consisting of a unitary member composed of noiseless, longitudinally reinforced, non-metallic material and having formed as an integral part of its non-parallel sides transversely offset teeth incorporating involute drive transmitting surfaces separate from the corresponding non-parallel belt side and adapted wedgingly to engage the teeth and sides of the V-groove.

5. Positive drive mechanism comprising in combination, a unitary V-belt of general trapezoidal cross-section, said V-belt being of rubber-like composition and formed to provide transversely raised curved teeth integrally incorporated at predetermined intervals in the non-parallel sides thereof, and projecting transversely so as to present transverse surfaces, said belt being adapted to be fed into running engagement with a V-sheave with each raised tooth being characterized by an involute face inclined to the line of motion and separate from the corresponding non-parallel belt side thereby presenting a projected area perpendicular to the direction of drive in order to afford a normally-situate drive-transferring bearing surface, and a rotatable sheave providing a V-groove for the belt having inwardly raised teeth of gradually narrowing cross-section from root to tip formed therein conforming in spacing to the intervals between said belt teeth, the bearing surface of each tooth in the rotatable sheave having a surface component revolvable normalwise to the direction of rotation and serviceable as a drive-transferring bearing surface to establish cooperation with the corresponding involute belt bearing surface, said sheave teeth being adapted to interfit with the belt teeth on occasion of the belt being fed into running engagement with the sheave whereby the sides of the V-groove provide the working surface of engagement with the belt and serve to support the belt.

6. Positive drive mechanism comprising in combination, a one-piece endless V-belt of rubber-like composition having wire reinforcement therein and being formed to provide transversely offset teeth of said composition integrally incorporated to the non-parallel sides thereof in a manner so as to present drive transmitting surfaces each separate from the corresponding non-parallel belt side with the teeth being disposed in a predetermined axially spaced relationship, and a rotatable sheave providing a peripheral V-groove for the belt having inwardly raised teeth of gradually narrowing cross-section from root to tip formed therein in conformity with the predetermined spacing of said belt teeth, said raised sheave teeth interfitting with the belt teeth and defining outwardly widening sockets cooperating with the drive transmitting surfaces of the latter on occasion of the belt being fed into running engagement with the sheave whereby the sides of the V-groove provide the working surface of engagement with the drive transmitting surfaces of the belt and support the belt in the groove.

7. In combination with the V-grooved sheave member of a two-member positive drive mechanism, said sheave member having formed in each of the opposed faces of its groove a set of spaced teeth coextensive therewith, a flexible V-belt member adapted to be received in said V-groove, said V-belt member being composed of noiseless longitudinally reinforced, non-metallic material and having a set of spaced teeth formed as an integral part of each of its non-parallel side faces, the last-said set of teeth being elastic teeth transversely raised out of the just-named side faces of the belt, at least one of the aforesaid sets of spaced teeth on one said member embodying a straight line tooth profile and another of the aforesaid sets of teeth establishing cooperation therewith to produce the above described two-member positive drive and incorporating a generated involute curve surface from tooth flank to tooth crown separate from the corresponding adjacent face of the other-said member and adapted wedgingly to engage the straight teeth and faces of the one-said member.

RICHARD N. SHIELDS.

References Cited in the file of this patent

UNITED STATES PATENTS

| Number | Name | Date |
|---|---|---|
| 355,555 | Radford | Jan. 4, 1887 |
| 494,131 | Edmunds | Mar. 28, 1893 |
| 504,208 | Fox | Aug. 29, 1893 |
| 587,806 | Fox | Aug. 10, 1897 |
| 859,197 | Byrom | July 9, 1907 |
| 1,105,518 | Irvin | July 28, 1914 |
| 1,792,921 | Newhouse | Feb. 17, 1931 |
| 1,832,871 | Meyer | Nov. 24, 1931 |
| 1,847,177 | Freedlander | Mar. 1, 1932 |
| 2,054,619 | Freedlander | Sept. 15, 1936 |
| 2,294,821 | Yelm | Sept. 1, 1942 |
| 2,397,312 | Forrest | Mar. 26, 1946 |

FOREIGN PATENTS

| Number | Country | Date |
|---|---|---|
| 7,628 | France | July 9, 1907 |